Figure 2:
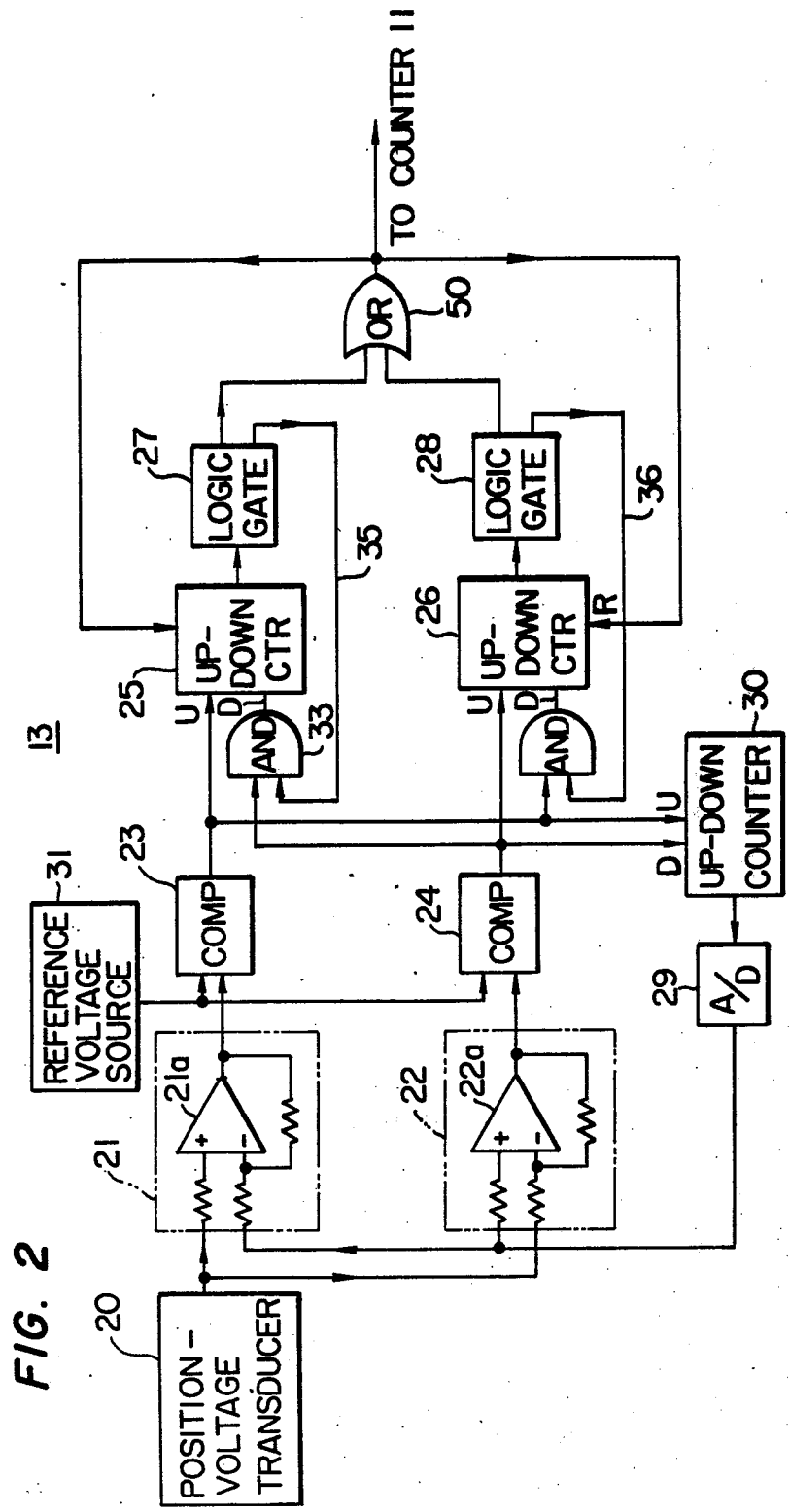

United States Patent [19]

Yanagishima

[11] 4,007,357
[45] Feb. 8, 1977

[54] CIRCUIT FOR DETECTING RELATIVE ANGULAR DISPLACEMENT OF A STEERING WHEEL

[75] Inventor: Takayuki Yanagishima, Yokohama, Japan

[73] Assignee: Nissan Motor Co., Ltd., Yokohama, Japan

[22] Filed: July 31, 1975

[21] Appl. No.: 600,925

[30] Foreign Application Priority Data

Aug. 2, 1974 Japan .................. 49-88709

[52] U.S. Cl. .................. 235/92 EV; 235/92 PE; 235/92 MP; 235/92 TC; 235/92 R; 340/52 R; 340/279; 180/99

[51] Int. Cl.² .................. G08B 21/00; G06M 3/02; G06M 3/14

[58] Field of Search ...... 235/92 EV, 92 PE, 92 CA, 235/92 TC, 92 DN, 92 MP, 92 CV; 340/52 R, 279; 180/99, 97

[56] References Cited

UNITED STATES PATENTS

| | | | |
|---|---|---|---|
| 3,106,981 | 10/1963 | Chakiris | 340/279 |
| 3,496,562 | 2/1970 | Smith | 235/92 EV |
| 3,559,205 | 1/1971 | Colby | 340/279 |
| 3,631,446 | 12/1971 | Setser | 340/52 R |
| 3,794,969 | 2/1974 | Klopfenstein et al. | 340/52 R |

Primary Examiner—Joseph M. Thesz

[57] ABSTRACT

First and second up-down counters are provided to operate in response to the steering movements of a motor vehicle. The first up-down counter operates as an up-counter while the steering wheel is rotated clockwise to increase its count by unit steps and operates as a down-counter while the steering wheel is rotated counterclockwise decreasing the count by unit steps to zero. The second up-down counter operates as an up-counter while the steering wheel is rotated counterclockwise and as a down-counter while the steering wheel is rotated clockwise. The content of each counter represents the relative angular displacement of the steering wheel. When a predetermined count is reached in each of the counters, an output is provided to indicate that the steering wheel has rotated a predetermined relative amount of angular displacement and the counters are cleared for subsequent counting operations.

14 Claims, 4 Drawing Figures

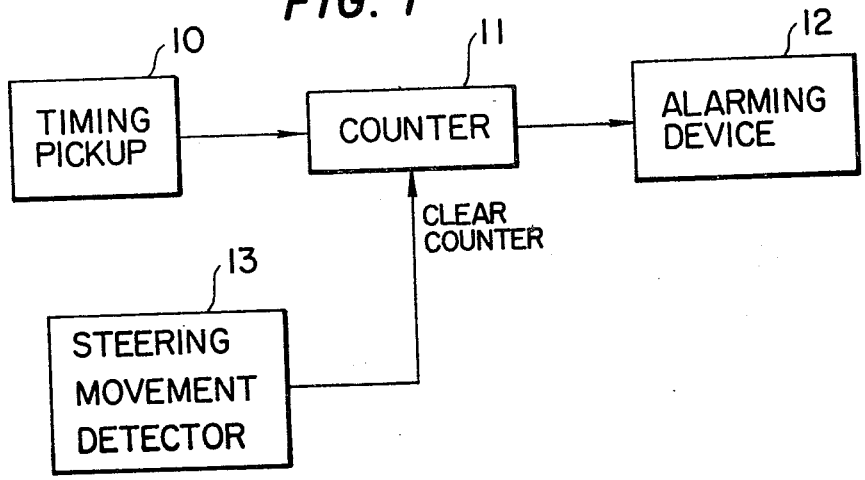
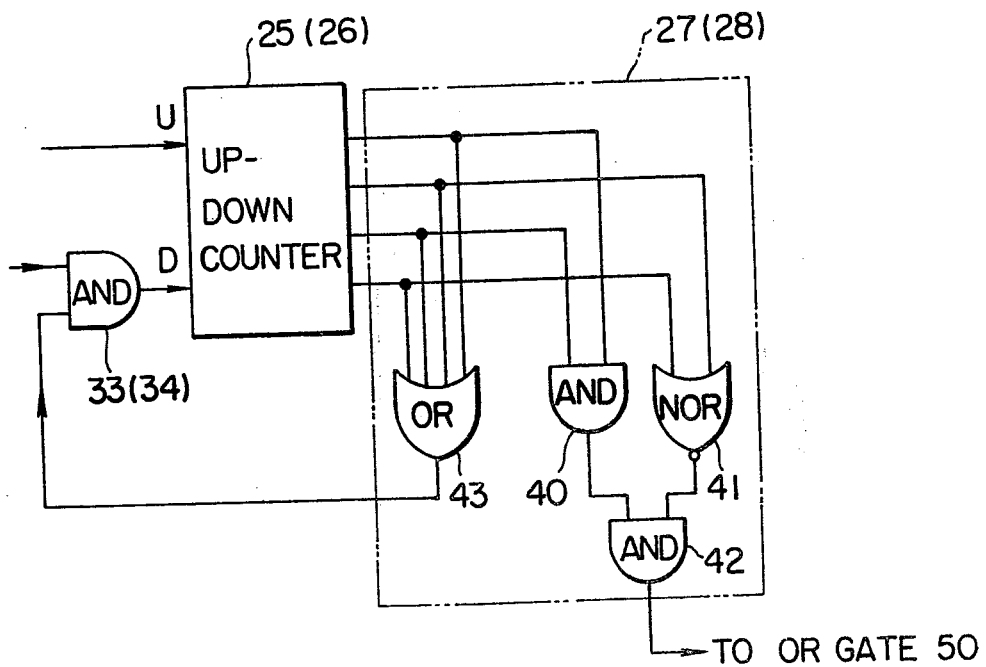

CIRCUIT FOR DETECTING RELATIVE ANGULAR DISPLACEMENT OF A STEERING WHEEL

The present invention relates to safety apparatus for a motor vehicle and in particular to a steering movement detector which detects the relative angular displacement of the steering movements.

Vehicle safety apparatus are designed to trigger an alarming device whenever a sensor detects a prolonged absence of steering operation during normal driving condition. To detect the steering movements prior art devices have been designed to detect the angular displacement of a steering wheel from the neutral or absolute position and provides a clear signal indicating that the driver is active whenever the displacement exceeds a predetermined fixed value. However, undesirable consequences might occur when a vehicle is driven over a roadway which is inclined sideways or when it encounters a strong transverse wind, because in such circumstances the driver will make an attempt to steer the vehicle to go straight by compensating for any departure from the intended path. In such circumstances steering movements occur frequently in the neighborhood of the set point of detection so that false clear signals will be produced by inconsequential steering movements.

The primary object of the present invention is therefore to provide an improved steering movement detector which detects the relative angular displacement of the steering wheel of a motor vehicle.

Another object is to provide an improved steering movement detector which includes a pair of up-down counters which are operated to count up or down in response to the direction of steering movements.

Briefly described, the invention contemplates the use of a position transducer which converts the angular position of the steering wheel into a corresponding electrical signal, and a pair of subtractor circuits which compares the electrical signal with a control variable to provide a first and a second differential voltage output which are further compared respectively with a small referecne voltage. The comparator output is fed back to the subtractors to control the variable so that the differential voltages decrease to a value smaller than the reference voltage. This turns off the output from the comparators so that first pulses are generated therefrom when said electrical signal increases in response to the steering movement in one direction and second pulses therefrom when the signal decreases in response to the steering in the opposite direction. A pair of up-down counters is provided to receive the first and second pulses in up-counting and down-counting modes. These up-down counters operate conversely to each other so that when one up-down counter operates in up-counting mode in response to the first pulses and in down-counting mode in response to the second pulses, the other counter operates in reverse fashion. When a predetermined count is reached in each of the counters, an output is provided to indicate that the driver is not incapacitated.

Figure 4:
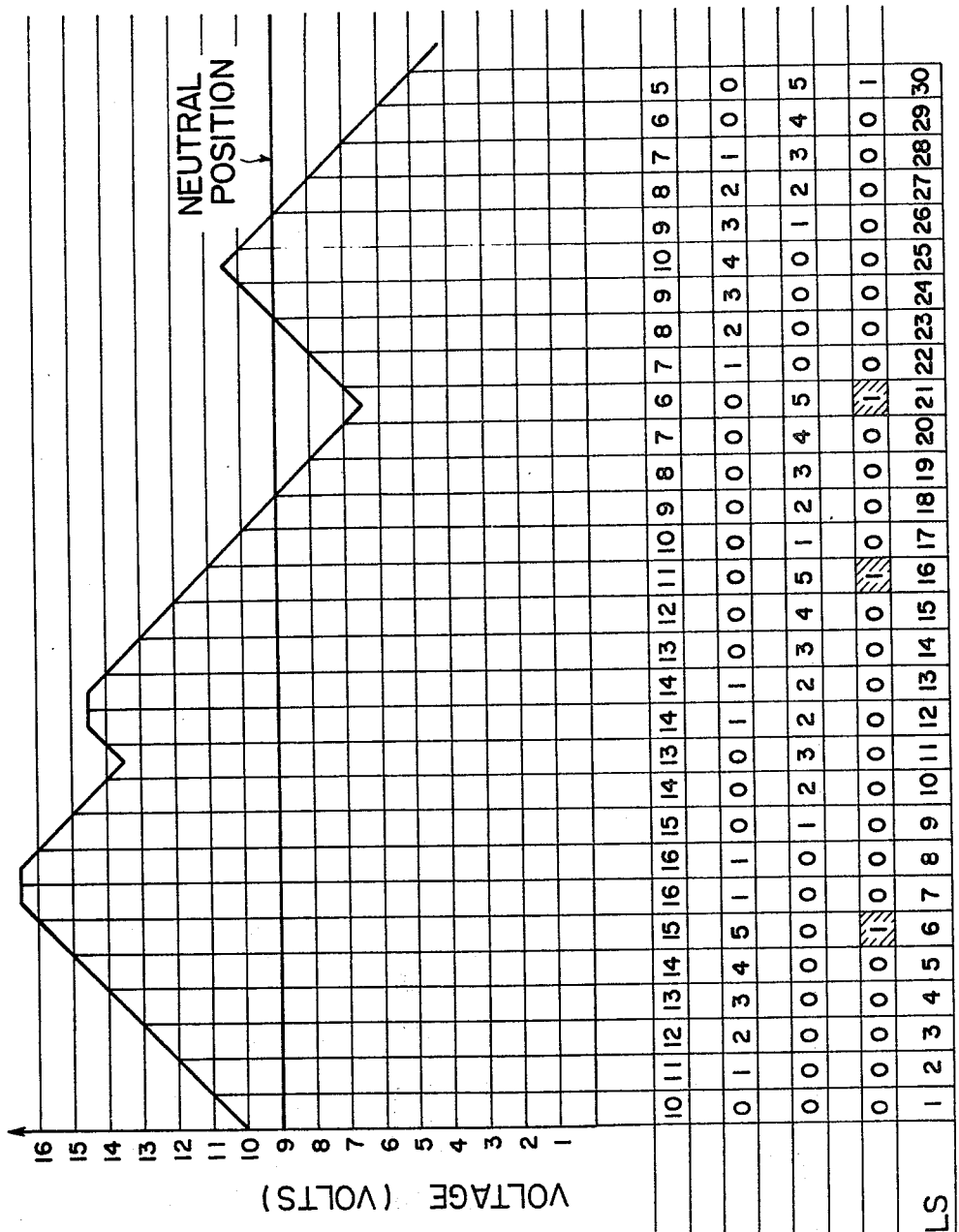

The invention will be further described by way of example with reference to the accompanying drawings, in which:

FIG. 1 is functional circuit diagram of a safety apparatus incorporating a steering movement detector of the present invention;

FIG. 2 a detailed circuit diagram of the detector of FIG. 1;

FIG. 3 is a circuit diagram of a logic gate circuit used in the circuit of FIG. 2; and FIG. 4 is a waveform diagram used to illustrate the operation of the circuit of FIG. 2.

Refeering now to FIG. 1, an overall circuit diagram of a safety apparatus embodying the invention is schematically shown. A timing pickup circuit 10 generates a train of timing pulses suitable for triggering a counter 11 to step up the count. The timing pulses may be obtained from the conventional distributer (not shown) used to provide ignition for each cylinder of the engine. The counter 11 develops an output when a predetermined number of counts is reached and couples its output to an alarming device 12 which upon receipt of the input alerts an occupant operating the vehicle by a suitable conventional means, such as warning buzzer or lamp.

The counter 11 is cleared by a signal derived from a steering movement detector 13. The detector 13 detects the relative angular displacement of the steering wheel and issues a clear signal when the angular displacement exceeds a predetermined amount. The counter 11 is thus cleared frequently by the steering action and as long as it continues there is no warning signal from the counter 11.

In accordance with the present invention, the steering movement detector 13 generally comprises, as shown in FIG. 2, a position-to-voltage transducer 20 which translates the angular position of the steering wheel into a proportional electrical signal, a pair of subtraction circuits 21 and 22, a pair of comparators 23 and 24, and a pair of up-down counters 25 and 26. The transducer 20 may be any of the type which comprises a potentiometer (not shown) coupled to the steering column for unitary rotation and across which a source of potential is connected. With the rotation of the steering column, the voltage developed across its variable tap and its terminal is caused to vary accordingly. The voltage signal developed by the transducer 20 is thus representative of the absolute angular position of the steering wheel with respect to a reference point which may be either one of the extreme ends to which the steering wheel is allowed to be rotated.

The output from the position transducer 20 is coupled to the subtractors 21 and 22 to which a voltage output from a digital-to-analog converter 29 is also applied. Each of the subtractors comprises a resistance network and an operational amplifier having a non-inverting and inverting input terminals designated by plus and minus signs, respectively, in the drawing. As is known in the art, output voltage from the operational amplifier is the sum of positive and negative terms that are related to the input voltages. The output voltage from the transducer 20 is coupled to the non-inverting terminal of the operational amplifier 21a of subtractor 21 and to the inverting terminal of the operational amplifier 22a of subtractor 22, while the converter output is applied to the inverting terminal of amplifier 21a as an offset voltage to cancel the transducer output and to the non-inverting terminal of amplifier 22a as a voltage to be cancelled by the transducer output. Therefore, the net voltage from amplifier 21a results only when the transducer output is greater than the offset voltage, while the net voltage from amplifier 22a results only when the transducer output is smaller than the converter output.

Each of the outputs from subtractors 21 and 22 is thus representative of the deviation from the converter output which is variable in accordance with the subtractor outputs as will be described below.

The subtractor outputs are applied to the comparator 23 and 24 for comparison with a constant reference voltage supplied from source 31. Each of the comparator 23, 24 provides an output only if the subtractor output is greater than the reference voltage. The output from the comparator 23 is connected to the up-counting terminal of an up-down counter 30 and the output from the comparator 24 is coupled to the down-counting terminal of counter 30. The up-down counter 30 is a combination parallel up- and down-counters and may be of the type SN 74123 available from Texas Instruments Corp. The counter 30 operates as a parallel up-counter when its up-counting terminal is activated while it operates as a parallel down-counter when its down-counting terminal is activated.

During the up-counting mode, the counter 30 successively increases by unit steps any count which is present in it and during the down-counting mode, decreases the count by the unit step to zero.

Assume that the voltage output from position transducer 20 is greater than the output from D/A converter 29, the subtractor 21 will provide a difference output to the comparator 23 in which it is compared with the reference voltage, and if greater than the latter, drives the up-down counter 30 in the up-counting mode. In counter 30, any count previously present therein is increased by unit steps as long as the up-counting input is present. The parallel binary output from counter 30 is received and translated by the converter 29 into a proportional voltage which varies by a unit voltage, for example, in accordance with the binary output. The output voltage from subtractor 21 is thus decreased by unit voltages until it assumes a value equal to the reference voltage from source 31. Therefore, the output from the comparator 23 represents an increment in the voltage at the output of transducer 20 when the steering position is being moved in one direction.

In like manner, when the converter output becomes greater than the transducer output, up-down counter 30 will be switched to the down-counting mode so that the converter output decreases by unit voltages until the inputs to the comparator 24 becomes equal to each other. Therefore, the output from comparator 24 represents a decrement in the voltage at the transducer output when the steering position is being moved in the opposite direction. It is thus preferred that the reference voltage from source 31 is small as possible as compared with the voltage delivered from the position transducer 20 so that up-down counters 25 and 26 can quickly respond to any small amplitude of steering movements.

Concurrently, the outputs from comparators 23, 24 are fed into the up-counting terminals of the up-down counters 25 and 26, respectively. The presence of the output from comparator 23 causes counter 25 to count up by unit steps and its parallel output is transmitted to a logic gate circuit 27 to provide an output when a predetermined binary number, for example, 0101 (which is 5 in decimal number) is reached.

The output from comparator 24 is also coupled by way of AND gate 33 to the down-counting terminal of counter 25 and the output from comparator 23 is also coupled by way of AND gate 34 to the down-counting terminal of counter 26. When the output from comparator 23 ceases and the output from comparator 24 appears, the counter 25 will start to count down. To discontinue the count down operation when the count reaches zero, AND gate 33 is inhibited by the output from logic gate 27 over lead 35.

An example of circuitry required to perform the gating function is shown in FIG. 3. When a parallel decimal coded binary output 0101 appears on the output leads of up-down counter 25, AND gate 40 and NOR gate 41 of logic gate 27 are enabled to bring the output of AND gate 42 to a high logic level which is coupled via OR gate 50 to the counter 11 of the safety apparatus in order to cancel any count which is present in counter 11. This clear signal is also used to clear the counter 25 of steering detector 13 for subsequent counting operations.

Upon reversal of steering movements, up-down counter 26 will be switched to the up-counting mode by the presence of output from comparator 24 and a similar process will be repeated until predetermined count, preferably the same count as in coutner 25, is reached.

The waveform shown in FIG. 4 illustrates the actual operation of the steering detector circuit 13. In FIG. 4, the vertical column are used to indicate the clock intervals determined by the clock supplied to the up-down counters 25, 26 and 30 and the horizontal rows are used to designate the voltage level by the steps of unit voltage, and the analog waveform is the voltage output from the position transducer 20. The numerals in the vertical columns indicate the count in each of the up-down counters 30, 25 and 26, and the presence or absence of the clear signal is indicated by numeral 1 or 0, respectively.

It is assumed that up-down counters 25, 26 are initially reset to zero and the reference voltage from source 31 is a unit volt and the converter output is stabilized to 10 volts which corresponds to the count 10 in counter 30. In the time interval 1, the voltage level at the transducer output lies between 10 and 11 volts. This causes the subtractor 21 to deliver output which is smaller than unit volt to the comparator 23. Comparator 23 produces no output and thus counter 25 remains zero. With the rotation of the steering wheel in one direction, the transducer output exceeds the 11-volt level in interval 2 so that the output from the subtractor 21 becomes greater than the unit voltage. This causes comparator 23 to produce an output which in turn causes counter 30 to count up to 11 so that convertor output increases to 11 volts. This increase in convertor output reduces the output from comparator 21 to a value smaller than unit volt so that output from comparator 23 is turned off. Therefore, during time interval 12, a single pulse is delivered from comparator 23 and a count one is stored in up-down counter 25. With a further movement of the steering wheel in the same direction of rotation, the transducer output increases and comparator 23 produces successive pulses which are stored in counter 25 until its count reaches five at interval 6 which is 0101 in binary representation. Logic gate circuit 27 detects the count of five and delivers a clear signal through OR gate 50 to the counters 11 and 25. A further increase in voltage at the transducer output will cause the counter 25 to count up to one in the subsequent interval 7. As the transducer voltage remains substantially constant during intervals 7 and 8, the output from comparator 23 will cease, causing counter 25 to remain at the same count.

When the steering wheel is rotated in the opposite direction with the resultant decreases in transducer output and its decrement is greater than unit voltage as at intervals 8 and 9, the output from comparator 23 will cease and subtractor 22 will produce an output since the transducer output becomes smaller than the convertor output of 16 volts. Since the voltage decrement during time intervals 8 and 9 is greater than unit voltage, comparator 24 will provide an output which drives the compensating up-down counter 30 in the down-counting mode so that its count is decreased to 15. The presence of output from comparator 24 causes counter 25 to switch to the down-counting mode so that its count is decreased from one to zero. On the other hand, up-down counter 26 is switched to the up-counting mode and increases its count to one.

Since the counter 25 has been counted down to zero, an OR gate 43 of logic gate 27 provides a low level logic which inhibits AND gate 33. Counter 25 will thus remain at the zero count during intervals 9 to 11 in which the transducer voltage is on the decrease.

Counter 26 continues up-counting during intervals 9 to 11 and, upon reversal of steering movements during intervals 11 and 12, decreases its count to two at interval 12 and remains there until the transducer voltage starts to decrease again at interval 14. By the reverse movement of the steering wheel during intervals 11 and 12, the counter 26 is counted down from three to two and remains there until interval 13. At interval 13 up-counting is started again by a further reversal of steering movement. By the reversal of steering movement, counter 26 counts down and one and then counts up again at the instant of further reversal of the steering movements at interval 14. At interval 16 a second clear signal is produced. A continuation of the same steering movement during intervals 17 to 21 produces a third clear signal at interval 21. Upon reversal of the steering movements at interval 21, counter 25 begins counting up until it counts four at interval 25 whereupon the steering movement reverts so that counter 25 counts-down to zero while counter 26 begins to count up to five to give a fourth clear signal at interval 30.

As will be understood from the foregoing description, the steering movement detector 13 can respond to the relative angular displacement of the steering wheel when it exceeds a predetermined count, which is five in this example, while disregarding the steering movements of small amplitude less than count of four which might frequently occur when the driver becomes drowsy.

To utilize the steering movement detector of the present invention as a means for indicating that the driver is not incapacitated, the arrangement of FIG. 1 can be replaced with an analog circuit using an operational integrating amplifier receptive of a direct-current voltage and a comparator which compares the output of the integrating amplifier with a reference voltage to utilize the difference output to trigger the alarming device. In such a case, the clear signal from the detector 13 will be applied to the integarding amplifier to discharge the accumulated voltage.

In summary, the first up-down counter 25 operates as an up-counter while the steering wheel is rotated, for example, clockwise and operates as a down-counter as it rotates counterclockwise, and the second up-down counter 26 operates in reverse mode. The content of each of the counter 25, 26 is a measure of the relative angular displacement of the steering wheel. A clear signal can be produced, at any suitable count in each of the counters 25, 26 when steering exceeds a predetermined angular displacement measured from the previous angular position.

What is claimed is:
1. A circuit for detecting the relative angular displacement of the steering wheel of a motor vehicle, comprising:
   means for translating the angular position of said steering wheel into a corresponding electrical signal:
   a first comparator which compares said electrical signal with a controlled variable to provide a first output when the former is greater than the latter, said output representing the difference therebetween;
   a second comparator which compares said electrical signal with said controlled variable to provide a second output when the former is smaller than the latter, said second output representing the difference therebetween;
   a third comparator which compares said first output with a reference value to provide a third output;
   a fourth comparator which compares said second output with said reference value to provide a fourth output;
   feedback circuit means for controlling said variable to decrease the magnitude of said first and second outputs to a value smaller than said reference value;
   a first up-down counter operable in count-up mode in response to said third output and in count-down mode response to said fourth output;
   a second up-down counter operable in count-up mode in response to said fourth output and in count-down mode in response to said third output; and
   means coupled to the output of each of said first and second up-down counters to provide an output when a predetermined count is reached.

2. A circuit as claimed in claim 1, including means for inhibiting the count-down operation of said first and second up-down counters when the count therein reaches zero.

3. A circuit as claimed in claim 1, including means for clearing said first and second up-down counters when the output occurs from said last-mentioned means.

4. In a safety apparatus for a motor vehicle includig a detector for the movement of the steering wheel of the vehicle and means responsive to the detection of the steering movements for measuring the interval between successive steering movements, and means for alerting a vehicle occupant when said interval is in excess of a predetermined interval, said detector comprising:
   means for detecting the direction of rotation of the steering wheel to provide first and second electrical signals;
   means for storing binary quantities in response to said first signal and decreasing the stored quantities in response to said second signal and providing an output when the stored quantities exceeds a first predetermined value; and
   means for storing binary quantities in response to said second signal and decreasing the stored binary quantities in response to said first signal and providing an output when the stored quantities exceed a second predetermined value, said outputs being coupled to said measuring means.

5. In a safety apparatus for motor vehicle including a detector for the movements of the steering wheel of the vehicle and means responsive to the detection of the steering movements for measuring the interval between successive steering movements, and means for alerting a vehicle occupant when said interval is in excess of a predetermined interval, said detector comprising:
   means for translating the angular position of said steering wheel into a corresponding electrical signal;
   means responsive to said electrical signal for generating a first signal when the angular position of said steering wheel represented by said electrical signal varies in one direction and a second signal when said angular position varies in the opposite direction;
   a first up-down counter for counting up in response to said first signal and counting down in response to said second signal to provide an output when the count reaches a first preselected value; and
   a second up-down counter for counting up in response to said second signal and counting down in response to said first signal to provide an output when the count reaches a second preselected value.

6. In a safety apparatus for a motor vehicle including a detector for the movements of the steering wheel of the vehicle and means responsive to the detection of the steering movements for measuring the interval between successive steering movements, and means for alerting a vehicle occupant when said interval is in excess of a predetermined interval, said detector comprising:
   means for translating the angular position of said steering wheel into an incremental voltage when the steering wheel is rotated in one direction and a decremental voltage when the steering wheel is rotated in the opposite direction;
   a first pulse generator for generating first pulses when said incremental voltage successively exceeds equally spaced-apart predetermined voltage levels;
   a second pulse generator for generating second pulses when said decremental voltage successively falls below said predetermined voltage levels;
   a first up-down counter for counting up in response to said first pulses and counting down in response to said second pulses to provide an output when the count reaches a first preselected value; and
   a second up-down counter for counting up in response to said second pulses and counting down in response to said first pulses to provide an output when the count reaches a second preselected value.

7. In a safety apparatus for a motor vehicle including a detector for detecting the movements of the steering wheel of the vehicle and means responsive to the detection of the steering movements for measuring the interval between successive steering movements, and means for alerting a vehicle occupant when said interval is in excess of a predetermined interval, said detector comprising first means sensitive to the direction of movement of the steering wheel and arranged to produce a first signal when the steering wheel is turned in a first direction and a second signal when the steering wheel is turned in the second direction, a first integration circuit for producing a third signal of which the magnitude increases with time in the presence of said first signal and decreases with time in the presence of said second signal, a second integration circuit for producing a fourth signal of which the magnitude decreases with time in the presence of said first signal and increases with time in the presence of said second signal, and means for producing an output signal when said third signal exceeds a first predetermined value or when said fourth signal exceeds a second predetermined value.

8. A detector as claimed in claim 7, wherein said first means comprises a transducer operative to translate the angular position of said steering wheel into a corresponding electrical quantity, and a circuit for producing said first signal when the said electrical quantity increases and for producing said second signal when said electrical quantity decreases.

9. A detector as claimed in claim 8, wherein the circuit for producing said first and second electrical signals in response to changes in said electrical quantity includes a feedback loop operative to produce a voltage which follows changes in the said electrical quantity and comparator means indicating whether the said electrical quantity is greater or less than the produced voltage.

10. A detector as claimed in claim 9, wherein said feedback loop comprises a first operational amplifier of which the non-inverting input is connected to the transducer, a second operational amplifier of which the inverting input is connected to the transducer, first and second comparators each connected to compare the output of a respective operational amplifier with a reference voltage and an integration circuit the output of which is connected to the other inputs of the operational amplifiers and is arranged to increase when one of the comparators produces an output signal and to decrease when the other comparator produces an output signal, the output signals of the comparators constituting said first and second signals, respectively.

11. A detector as claimed in claim 10, wherein the last-mentioned integration circuit comprises an up-down counter connected to the outputs of the comparators and having an output connected to the operational amplifiers by way of a digital to analog converter.

12. A detector as claimed in claim 11, wherein each of said first and second integration circuits comprise an up-down counter arranged to count up in the presence of one of said signals and to count down in the presence of the other and wherein the means for producing an output signal comprises logic gating means arranged to detect a predetermined count.

13. A detector as claimed in claim 12, wherein the output signal is connected to reset both of the up-down counters of the first and second integration circuits.

14. A detector as claimed in claim 13, wherein said logic gating means comprises means for detecting a zero count in either counter and for closing a gate connected to the down counting input of the counter whereby the count in each counter is prevented from dropping below zero.

* * * * *